United States Patent
Um et al.

(10) Patent No.: US 8,558,665 B2
(45) Date of Patent: Oct. 15, 2013

(54) DISPLAY APPARATUS AND METHOD FOR CONNECTING TO VIDEO CALL THEREOF

(75) Inventors: Taesue Um, Seoul (KR); Myunggi Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 208 days.

(21) Appl. No.: 13/008,274

(22) Filed: Jan. 18, 2011

(65) Prior Publication Data

US 2011/0310796 A1   Dec. 22, 2011

(30) Foreign Application Priority Data

Jun. 18, 2010   (KR) .................. 10-2010-0057896

(51) Int. Cl.
*G05B 19/00*   (2006.01)

(52) U.S. Cl.
USPC ..................... 340/5.74; 340/825.72; 370/328

(58) Field of Classification Search
USPC .............................. 370/328; 340/5.74, 825.72
See application file for complete search history.

(56) References Cited

U.S. PATENT DOCUMENTS

| | | | |
|---|---|---|---|
| 8,325,213 B2 * | 12/2012 | Lamb et al. ................. | 348/14.01 |
| 2006/0012489 A1 * | 1/2006 | Yokota et al. ............. | 340/825.72 |
| 2007/0070188 A1 * | 3/2007 | Shyu .......................... | 348/14.11 |
| 2007/0104042 A1 * | 5/2007 | Sugahara et al. .......... | 369/30.32 |
| 2008/0002820 A1 * | 1/2008 | Shtiegman et al. ....... | 379/211.02 |
| 2009/0010485 A1 | 1/2009 | Lamb et al. | |
| 2011/0096779 A1 * | 4/2011 | Woo et al. .................... | 370/390 |

FOREIGN PATENT DOCUMENTS

| | | |
|---|---|---|
| JP | 2007-243811 A | 9/2007 |
| KR | 10-2007-0059808 A | 6/2007 |

* cited by examiner

*Primary Examiner* — Hassan Kizou
*Assistant Examiner* — Hashim Bhatti
(74) *Attorney, Agent, or Firm* — Birch, Stewart, Kolasch & Birch, LLP

(57) ABSTRACT

Embodiments relates to a display apparatus that can perform a video call and a method of connecting to a video call thereof, in which the method includes: receiving a control signal from an external device where an identification information for a video call is registered when a video call is received; turning on the display apparatus in response to the received control signal; and connecting to the received video call.

20 Claims, 9 Drawing Sheets

DISPLAY APPARATUS AND METHOD FOR CONNECTING TO VIDEO CALL THEREOF

The present application claims priority benefits of Korean Patent Application No. 10-2010-0057896 filed on Jun. 18, 2010 in Republic of Korea, the entire contents of which are fully incorporated by reference.

BACKGROUND OF THE INVENTION

1. Field of the Invention

Embodiments relate to a display apparatus that can make a video call.

2. Description of the Background Art

As digital TVs and wire/wireless network technology having the ability of processing and storing signals better than the existing analog TVs have been developed and commercialized, it is possible to provide users with a variety of contents services, such as real-time broadcasting, COD (Contents on Demand), games, news, video calls, etc. by using the internet network provided in each home, other than the existing radio media.

An IPTV (Internet Protocol TV) can be an example of the contents services provided through the internet network. The IPTV is to transmit and provide various information services, video contents, and broadcasting to the televisions of users, using the high-speed internet network.

Recently, a broadband TV and a web TV, etc. has been proposed, as a type of network TV that may be further advanced than the IPTV. Unlike the existing IPTV, in the broadband TV or web TV, there are several contents providers and users can be provided with contents that the contents providers provide, such as various VODs and games, by individually connecting to the several contents providers.

SUMMARY OF THE INVENTION

Embodiments provide a display apparatus that can easily make a vide call and a method controlling the display apparatus.

An embodiment provides a method for connecting a display apparatus to a video call, which includes: receiving a control signal from an external device where identification information for a video call is registered when a video call is received; turning on the display apparatus in response to the received control signal; and connecting to the received video call.

Further, another embodiment provides a display apparatus, which includes: a camera for acquiring video data; a communication module for transmitting/receiving a signal to/from an external device where identification information for a video call is registered, and receiving a control signal from the external device, when the display apparatus is turned off and a video call is received; a controller for turning on the display apparatus in response to the received control signal; and a video communication processor connecting to the received video call.

The methods of connecting to a video call according to the embodiments of the invention can be implemented by one or more computer-readable media where program(s) executed by at least one computer are recorded.

According to an embodiment, the invention provides a method for controlling a digital TV (DTV) that can perform video communication through a video call, the method comprising: when a video call is received by the DTV while the DTV is turned off, receiving, by the DTV that is turned off, a control signal from an external device based on an identification information registered for the video call; selectively turning on the DTV in response to the received control signal; and connecting, by the turned-on DTV, to the received video call.

According to an embodiment, the invention provides a digital TV (DTV) that can perform video communication through a video call, the DTV comprising: a communication module configured to, when a video call is received by the DTV while the DTV is turned off, a control signal from an external device based on an identification information registered for the video call; a controller configured to turn on the DTV in response to the received control signal; and a video communication processor configured to connect to the received video call after the DTV is turned-on in response to the control signal.

BRIEF DESCRIPTION OF THE DRAWING

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Hereafter, a display apparatus and a method for connecting to a vide call thereof according to embodiments of the present invention are described in detail with reference to the accompanying drawings.

Figure 1:
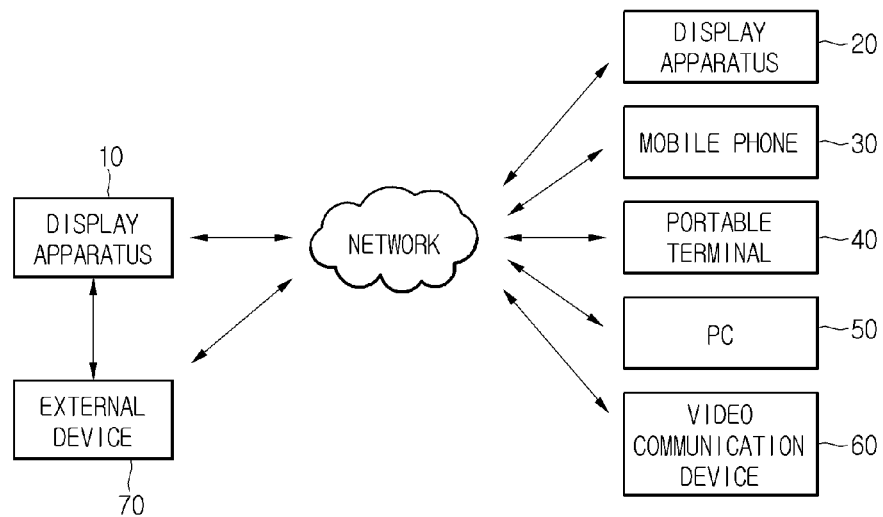
FIG. 1 is a block diagram illustrating the configuration of a video call system according to an embodiment of the invention.

FIG. 1 is a block diagram illustrating the configuration of a video call system according to an embodiment of the invention.

Referring to FIG. 1, a video call system is a system that allows a calling party and a called party to have a conversation while watching a video transmitted from the counterparts (e.g., a video call operation), using a plurality of devices that can process and transmit/receive video data and voice data. The calling party is the party that places a call (e.g., video call or normal call), and the called party is the party that receives the directed call (call recipient). The video call operation can involve a video conference call, an internet-based video call, etc. using various known networks (wired/wireless). The video call operation may include preferably an exchange of both audio and video data among the involved call parties, but may at sometimes be limited to an exchange of only audio data or only video data depending on capabilities and other factors. Further, two or more parties (e.g., two or more users or devices) may be involved in a video call operation. All the components of the video call system of FIG. 1 are operatively coupled and configured.

For example, in the video call system, a display apparatus 10 can acquire video/voice data corresponding to the user's video/voice, using input devices, such as a camera and a microphone, and transmit the acquired video/voice data to other devices 20 to 60 connected by wire/wireless networks. In this disclosure, "/" indicates and/or. For instance, video/voice encompasses video and/or voice. Further, in this and other embodiments of the invention, wherever the term 'voice' is used, this term is fully interchangeable with 'audio'. That is, although voice data is discussed, this is merely an example of audio data being communicated in a call operation, and the invention fully encompasses communication of any other audio data (e.g., music, sounds, etc.).

According to an embodiment of the present invention, the display apparatus 10 may be a digital TV (DTV) that receives digital broadcasting and displays videos and other data and the digital broadcasting may be a type of compressing and transmitting video/voice signals. The display apparatus 10 may also be a mobile terminal, PC, notebook, multimedia player, GPS, etc.

Meanwhile, the display apparatus 10 can receive video/voice data from other devices 20 to 60 connected by wire/wireless networks, and accordingly, video communication is possible between the display apparatus 10 and the other devices 20 to 60. The display apparatus 10 can communicate with one or more external devices 20 to 60 simultaneously, and vice versa. The external devices 20 to 60 may communicate with each other also during a video call operation.

As shown in FIG. 1, a device that can make video communication with the display apparatus 10 may be another display apparatus 20, a mobile phone 30, a mobile terminal 40, such as a PDA, smart phone and a notebook computer, a PC 50, and a video communication device 60 of the counterparts. Such devices may be referred to herein as the counter-devices.

Further, the network(s) connecting the display apparatus 10 with the counter-devices 20 to 60 allow for transmission and reception of video/voice data according to the communication standards for video communication. For example, the display apparatus 10 and the counter-devices 20 to 60 can transmit/receive video/voice data, using a network according to Ethernet or IEEE802.3, or can transmit/receive the video/voice data, using a wireless network according to IEEE 802.11.

Meanwhile, the network allows for data transmission and reception between the display apparatus 10 and the counter-devices 20 to 60, by using a VoBB (voice over broadband) or a legacy service. To be more specific, the VoBB may include a service, such as VoCM (voice over cable modem), VoDSL (voice over DSL), VoIP (voice over Internet protocol), FWA (fixed wireless access), FTTH (fiber to the home), or VoATM (voice over ATM). On the other hand, the legacy service may include ISDN (integrated service digital network), POTS (plain old telephone service), cellular or 3G service, etc. Therefore, the display apparatus 10 and the counter-devices 20 to 60 can transmit/receive video/voice data, using data networks, such as a wireless network, the existing telephone network, and internet, a cable modem system, or a cellular network, etc.

Meanwhile, the display apparatus 10 and the counter-devices 20 to 60 can transmit/receive video/voice data under the rules set therebetween, and for example, may use protocols, such as H.261 standard for coding video data, H.211 standard for video/voice data communication, and H.242 standard for call setting and cancel. In detail, protocols implemented from video communication standards, such as H.323, H.263, and H264 standards for video coding and G723.1, G.711, and G.729 for voice coding may be used for a video communication system using the internet.

The video communication system according to an embodiment of the present invention, however, is not limited to the configurations described above. For example, the devices 20 to 60 making a video communication with the display apparatus 10 are not limited to the devices 20 to 60 shown in FIG. 1, and standards, such as SIP, RTP/RTCP protocols, other than the standards described above, may be used.

According to an embodiment of the present invention, an external device 70 can be connected to the network for video communication system and can recognize a reception of a video call from the counter-devices 20 to 60. The external device 70 receiving the video call can transmit a control signal for turning on the display apparatus 10 to the display apparatus 10.

For example, when the display apparatus 10 has been turned off, the external device 70 connected to the video communication network recognizes the video call received by the display apparatus 10 and transmits a control signal to the display apparatus 10 in wire/wireless communication. Then the display apparatus 10 is turned on in response to the received control signal and can be connected to the received video call. For this operation, the external device 70 is connected to a wire/wireless network, such as the internet, to be connected with the video communication system described above, and identification information for a video call, for example an ID (Identification) and a password for logging-in the video communication network may be registered. For example, the external device 70 can be provided with an ID and a password that are the same as the identification information for a video call registered in the display apparatus 10 and may be connected to the video communication network by using the registered identification information and internet, and thus recognize a vide call received by the display apparatus 10.

Therefore, when a video call is directed to the display apparatus 10 that is currently turned on, the external device 70 recognizes this reception of the video call and generates and transmits a control signal to turn on the display apparatus 10. In turn, the display apparatus 10 is turned on and then connected to the video call by the control signal transmitted from the external device 70, such that it is possible to efficiently answer the received video call anytime, e.g., even when the display apparatus 10 was turned off when the video call directed to the display apparatus 10 was received. Further, since the display apparatus 10 does not need to be always turned on for this operation according to the invention, power consumed by the display apparatus 10 can be reduced.

Meanwhile, the external device 70 may be preferably a device that is always turned on to operate, such as a refrigerator, a telephone, or a fax machine, in order that the external device 70 can recognize a reception of a video call to the display apparatus 10. The external device 70 may be a mobile terminal such as a smart phone, PDA, notebook, etc. or a digital TV or a device having remote control functions. Further, the display apparatus 10 and the external device 70 can be connected in wireless communication for transmitting/receiving the control signal, and for example, may transmit/receive signals, using local wireless communication, such as Zigbee, Bluetooth, or Wlan.

Figure 2:
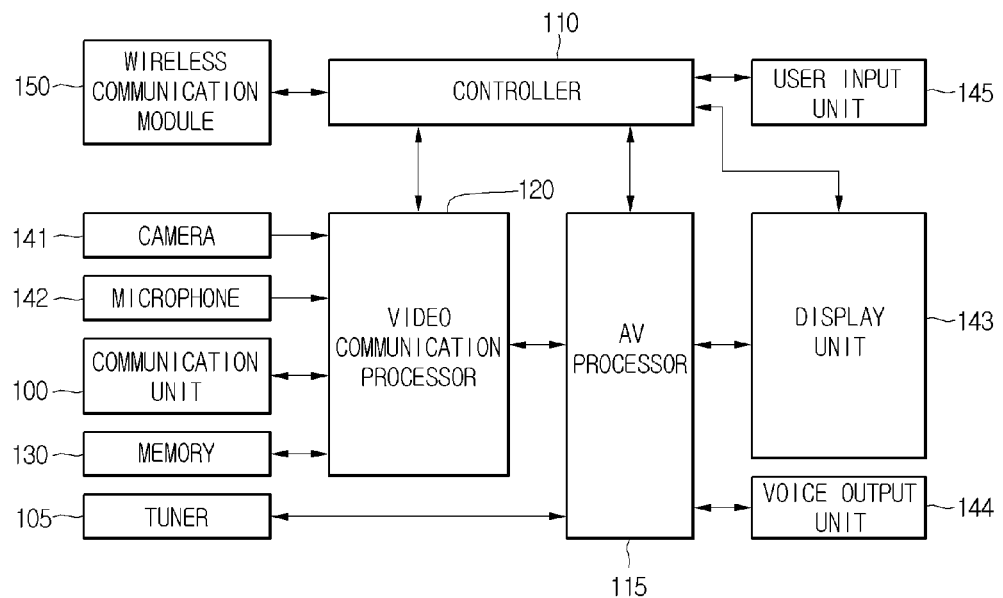
FIG. 2 is a block diagram illustrating the configuration of a display apparatus according to an embodiment of the present invention.

FIG. 2 is a block diagram illustrating the configuration of the display apparatus 10 according to an embodiment of the present invention, in which the display apparatus may includes a communication unit 100, a tuner 105, a controller 110, an AV (audio and/or video) processor 115, a video call processor (or video communication processor) 120, a memory or storage unit 130, a camera 141, a microphone 142, a display unit 143, a voice/audio output unit 144, a user input unit 145, and a wireless communication module 150. The camera 141 (or any camera in other embodiments) can be built into the display apparatus 10 such the DTV, or can be a separate device connected to the display apparatus 10. All components of the display apparatus 10 are operatively coupled and configured.

Referring to FIG. 2, the communication unit 100 is connected with a display apparatus (or counter-device) of a counterparts or a server for video communication service and can transmit/receive video communication data. For example, the communication unit 100 can transmit a transmission stream including AV data corresponding to the user's video and voice to a counter-device, for example, a display apparatus of the counterpart, through a wire/wireless network.

Further, the communication unit 100 can also receive a reception stream including AV data corresponding to the counterpart's video and voice in the video communication, from the display apparatus (counter-device) of the counterpart. In detail, the communication unit 100 is connected with the counterpart's display apparatus by Ethernet or wire/wireless network, such as IEEE 802.3, IEEE 802.11 and can transmit/receive AV data according to a video call with the counterpart's display apparatus.

The video call processor 120 can process and output video communication data, e.g., user's AV data that is acquired by the camera 141 and the microphone 142, and the counterpart's AV data received through the communication unit 100, in accordance with a predetermined video communication method, e.g., a video communication standard, for example, H.323, H.263, or H264 standard for video data or G723.1, G.711, or G.729 for voice data. For example, the video call processor 120 can encode the video data in accordance with the standards, such as H.323, H.263, and H.264, and output an elementary stream type of video stream, which may be the basis stream of digital data. Further, the video call processor 120 can encode the voice data in accordance with the standards, such as G.723.1, G.711, and G.729, and output an elementary stream type of voice stream.

The AV processor 115 can convert the video communication data outputted from the video call processor 120, for example, the user's video/voice data and the counterpart's video/voice data in a video call, into a format that can be outputted from the display unit 143 and the voice output unit 144. For example, the AV processor 115 can process the call videos of the user and the counterpart to be able to be outputted by the display unit 143, using the video communication data processed by the video call processor 120.

The AV processor 115 can process the call voices of the user and the counterpart to be able to be outputted by the output unit 144, using the video communication data processed by the video call processor 120. Further, the AV processor 115 can convert the contents outputted from the outside or stored in the display apparatus 10 into a format that can be outputted from the display unit 143 and the voice output unit 144.

Referring to FIG. 2, the AV processor 115 can process a digital broadcasting signal received through the tuner(s) 105 to be able to be outputted to the display unit 143 and the voice output unit 144. To be more specific, the AV processor 115 converts the call video according to the video communication data received by the communication unit 100 and the contents video according to the broadcasting signal inputted through the tuner 105 into a format that can be displayed, and accordingly the display unit 143 can display at least one of the call video and the contents video on the screen of the display unit 143. Here, the call videos can be videos associated with a video call operation, such as images of the parties involved in the video call, and the contents videos can be broadcast programs, TV programs, broadcast data such as EPG or advertisement data, etc.

The AV processor 115 may perform pre-processes for improving or adjusting the quality of video to fit to a specific object, such as readjusting brightness, removing a noise, smoothing, and sharpening.

The memory 130 can store programs and data for the operation of the display apparatus or user's information etc. The camera 141 takes pictures (e.g., shots or moving videos) of the area around the display apparatus, e.g., the area including the user, and can acquire and output video data corresponding to these pictures. Meanwhile, the camera 141 may be attached to a side of the main body of the display apparatus, such as a Web Cam, and thus may be arranged to take a picture of the front area of the display apparatus where the user(s) may be positioned. As such, the camera 141 takes images (e.g., shots or moving images) of the user(s) positioned in front of the camera 141 and can send the images of the user(s) to the apparatus(es) of the other party(ies) involved in the video call operations under control of the controller 110.

The microphone 142 collects sounds including voice generated around the display apparatus, e.g., the user's voice, and can output voice data corresponding to the sounds. Meanwhile, the microphone 142 may be attached to one side of the main body of the display apparatus or disposed outside the display apparatus, for example, adjacent to the user.

The display unit 143 displays the user's video acquired by the camera 141, e.g., a call video to be transmitted to the display apparatus of the counterpart, and can display the counterpart's call video received by the communication unit 100, while it can display videos of the contents inputted from the outside or stored therein. For example, the display unit 143 can display videos, using various types of display panels, such as a DLP (Digital Light Processing), an LCD (Liquid Crystal Display), and PDP (Plasma Display Panel). The display unit 143 can be a touch-sensitive screen so that the user's input may be entered using such screen.

Further, the voice output unit 144 outputs the user's call voice acquired by the microphone 142 and can output and transmit the counterpart's call voice received through the communication unit 100 to the user. The user input unit 145 may be provided with a plurality of key buttons for the user's input, or display a plurality of key buttons on a touch panel, such that it can receive inputs for controlling the operation of the display apparatus 10. Meanwhile, the user input unit 145 may be disposed outside the display apparatus 10, and for example, may be a remote controller having a plurality of key buttons for user's input. The user input unit 145 may be a keypad or keyboard (soft or hard keys), a mouse, a touch-sensitive screen, etc.

The controller 110 controls the entire operation of the display apparatus described above, and can control the video call processor 120, the AV processor 115, and the user input unit 145, respectively.

The display apparatus 10 can receive a video and/or a voice call according to an internet telephone service through the VoIP (Voice Over Internet Protocol) network, but the present invention is not limited thereto and can receive a normal telephone call using the PSTN (Public Switched Telephone Network) or a mobile phone call using a mobile communication network.

Meanwhile, the wireless communication module 150 transmits/receives signals to/from the external device 70, using local wireless communication, and can receive the control signal described above from the external device 70, e.g., a signal transmitted from the external device 70 to turn on the display apparatus 10 when the display apparatus 10 (turned-off) is receiving a video call, in accordance with an embodiment of the present invention. For this operation, while the display apparatus 10 is generally turned off (e.g., switched off), it is preferable that power is supplied to the wireless communication module 150 which is preferably always ready to receive the control signal from the external device 70. This control signal is to turn on the turned-off display apparatus 10 so that the display apparatus 10 can receive and process the incoming video call.

According to an embodiment of the present invention, the display apparatus 10 and the external device 70 can transmit/receive various signals including the control signal, using the ZigBee wireless communication, and for this operation, the wireless communication module 150 of the display apparatus 10 may include at least one ZigBee module and the external device 70 may also include at least one ZigBee module that can transmit the control signal. The ZigBee system may be preferably composed of a plurality of ZigBee modules, in which the ZigBee modules may be an RFD (Reduced Function Device), a router R, or a coordinator which is operated by an end device E.

Meanwhile, the ZigBee module may function as an RFD, a FFD (Full Function Device), or a coordinator, in accordance with the program processing data of a network hierarchy or a framework hierarchy. The FFD initializes the network, manages nodes, and stores node information, and can communicate with all of other FFDs or RFDs. Further, the FFD that allows the other ZigBee devices to make any one of the three nodes described above is called a PAN (Personal Area Network) coordinator. The coordinator makes a PAN identified by a channel and a PAN ID, and assign a network address to the router or the RFD.

The RFD cannot perform the coordinator function and the routing function and is an object to the coordinated as a ZigBee module operated by the end device, and can communicate with the router of the coordinator. For instance, the RFD may participate in the PAN composed of the same channel and PAN ID. The FFD that is controlled by the coordinator, processes the routing path, and transmits data to the RFD is called a router. The router participates in the PAN composed of the same channel and PAN ID and allows the other routers or RFDs which do not participate yet in the PAN to participate in the PAN by assigning network addresses to them.

The ZigBee wireless communication described above is preferably free in installation, because there is no directionality in wireless signal transmission/reception, and the maximum wireless transmission/reception distance is about, e.g., 20 m (average about 10 m). Therefore, it is suitable for a video communication system according to an embodiment of the present invention. Further, the ZigBee module consumes a small amount of power, e.g., about 3 uA, for standing-by, and has a high response speed of, e.g., about 30 ms, and is inexpensive in comparison with other wireless communication equipment.

Therefore, a small amount of power, e.g., about 1 W or less, is consumed even if the wireless communication module using the ZigBee is kept operable within the display apparatus 10 that is turned off, such that it is possible to reduce power consumed by the display apparatus 10. As described above, when a video call is received at the display apparatus 10 that is turned off, the wireless communication module 150 (e.g., ZigBee module) of the display apparatus 10 receives a control signal from the external device 70 and thereby generates a signal to the controller 110 according to the received control signal. Then the controller 110 can turn on the display apparatus 10 in response to the signal inputted from the wireless communication module 150. Then, the video call processor 120 can be connected to the received video call by using the communication unit 100, after the display apparatus 10 is turned on, as described above.

Figure 3:
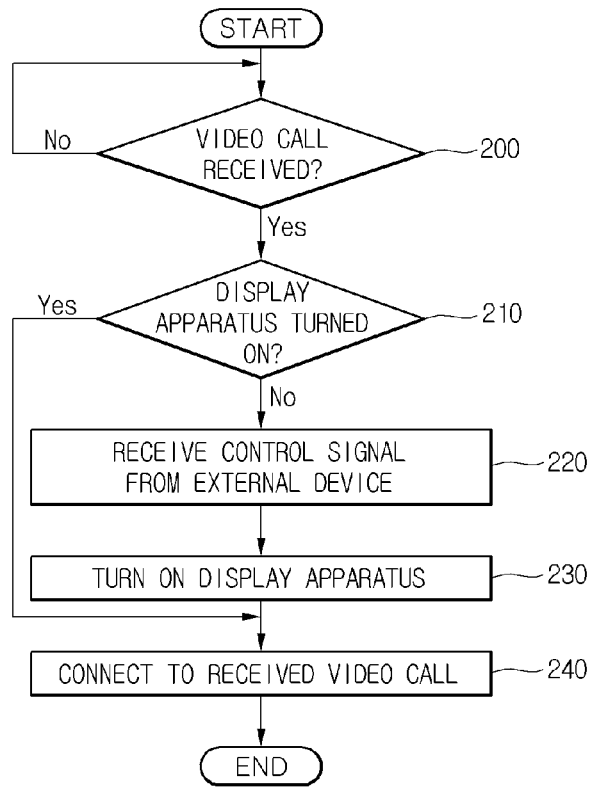
FIG. 3 is a flowchart illustrating a method for connecting to a video call of a display apparatus according to an embodiment of the present invention.

FIG. 3 is a flowchart illustrating a method for connecting to a video call of a display apparatus according to an embodiment of the present invention and the method illustrated in FIG. 3 is described in connection with the block diagram illustrating the configuration of the display apparatus according to the embodiment of the present invention shown in FIG. 2. The methods of FIG. 3 or other figures/examples of the invention can, however, be equally implemented using other display apparatus.

Referring to FIG. 3, it is ascertained whether a video call is received with an ID registered in the display apparatus 10 through a video communication network (step 200). As described above, since identification information for a video call is registered in the display apparatus 10 and the external device 70, and the display apparatus 10 and the external device 70 are both connected to the video communication network by the internet or other network/means, the display apparatus 10 can ascertain whether a video call is received while being turned on and the external device 70 can also ascertain whether a video call is received while being turned on. The display apparatus 10 may, however, fail to ascertain whether the video call is received while being turned off. As a vide call is received, it is ascertained whether the display apparatus 10 is turned on at step 210, and the display apparatus 10 recognizes the received video call and connects to the video call through the communication unit 100 when the display apparatus 10 is turned on at step 240. For instance, at steps 200 and 210, when a video call directed to the display apparatus 10 is received while the display apparatus 10 is turned on, the display apparatus 10 receives the call and proceeds with the video call operation.

On the other hand, when the display apparatus 10 is turned off at step S210 (such determination may be done by the external device 70), the external device 70 recognizes the reception of the video call, generates a control signal for turning on the display apparatus 10, and transmits the control signal to the display apparatus 10, using wireless communications such as ZigBee, etc. Accordingly, the wireless communication module 150 in the display apparatus 10 that is turned off receives the control signal from the external device 70 (step 220), which is then communicated to the controller 110 and the controller 110 turns on the display apparatus 10 in response to the received control signal at step 230.

The display apparatus 10 that has now been turned on, as described above, is connected to the received video call by using the video communication processor 120 and a user at the display apparatus 10 may carry out the video call with the other party(ies) (step 240).

Hereafter, an embodiment of the method for connecting to a video call of a display apparatus according to the present invention is described in detail with reference to FIGS. 4 to 8.

Figure 4:
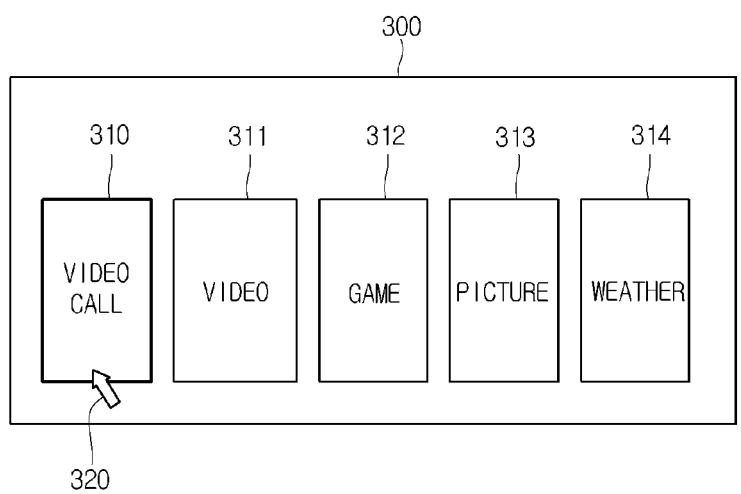
FIG. 4 is a diagram showing an embodiment of a method of providing a video call service from a display apparatus.

More specifically, FIG. 4 is a diagram showing an embodiment of a method of providing a video call service from a display apparatus of a display system. The display system according to an embodiment of the present invention may be composed of a network operator, one or more contents providers CP, and service provider(s), and the display apparatus such as the display apparatus 10 configured to communicate with the external device 70.

The network operator may provide basic software needed for contents provided from the contents provider to operate in the display apparatus 10. Further, it is possible to provide the contents provider with hardware information of the display apparatus 10 which is needed for the contents to operate in the display apparatus 10. For example, the network operator provides a main screen implemented when the contents provided from the contents providers are displayed on the display apparatus 10, and may provide a user interface for users to select the contents or input various instructions and display corresponding outputs. Further, the user interface can also provide information for updating the firmware or the software of the display apparatus 10, every time it is needed or periodically.

The contents provider produces a variety of contents that can be provided on the network and makes them in a format that the display apparatus 10 can play, and can provide the contents in accordance with request of the display apparatus 10. The contents may be predetermined data that can be serviced by the network. The service provider may be an internet service provider that provides network communication among the network operator, the contents provider, and the display apparatus 10.

The display apparatus 10 receives and plays/executes contents from the service provider in response to a request of a user. For example, the display apparatus 10 may include a broadcasting receiver, such as a network set-top box, and predetermined devices equipped with a network module, such as a telephone for network. For example, the contents provider may be an operator that produces various contents to provide to the display apparatus 10. The contents provider may include a TV station, a radio station, a VOD (video on demand) operator, an AOD operator, a game operator, a video communication service provider, a weather information provider, a photo-related service provider, an advertisement or other data provider, etc.

For instance, the video communication service provider may provide a relay service to allow for a video call with a user who uses another network TV, through the network. The display apparatus 10 preferably has a network interface to be able to be connected to a network and is provided with an IP address to process a data packet through the network, and may store or play the data packet when the data packet is multimedia data such as a video or audio. Further, the display apparatus 10 may perform bidirectional transmission of the user's requests while processing the multimedia data, and for this operation, a remote controller for controlling the display apparatus 10 may be provided with buttons or selectable items for controlling the network TV, e.g., buttons (soft or hard buttons) for selecting a variety of menus.

Referring to FIG. 4, the menu screen of the display apparatus 10 may include icons 310 to 314 representing a plurality of contents providers. The icons 310 to 314 displayed on a screen 300 of the display unit 143 in the display apparatus 10 may represent buttons/menus for connecting to the contents providers' servers and a user can be provided with a contents service by selecting one of the icons 310 to 314 to be connected to the contents providers' servers.

According to an embodiment of the present invention, at least one of the contents providers provides video communication service, and accordingly, any one of the icons 310 to 314 on the screen 300 of the display apparatus 10, for example, a 'video call' icon 310 may be an icon corresponding to the video communication service or for initiating a video call.

The user can be connected to the server of a contents provider by selecting the 'video call' icon 310 in the icons 310 to 314 on the screen 300 of the display apparatus 10, and thus can be provided with the video communication service. The user input unit 145 may be an input unit for selecting various items as described above, and for example, may be a remote controller connected with the display apparatus 10 by wire or wireless communication, or a device for sensing a movement of the parts of a body such as the user's fingers or eyes. For example, the remote controller may be an input unit such as a spatial remote controller or a mouse, which can recognize a motion of the user and transmit a signal corresponding to the motion to a contents player such as a multimedia player, an MP3 player, etc.

Further, the display apparatus 10 may be equipped with a touch panel for sensing a contact point of a specific object or movement of the contact object, and accordingly, the user can perform the selection described above by touching the screen with the finger(s) or a specific object. Meanwhile, the display apparatus 10 may be provided with a sensing unit that can sense a movement of the user's eye(s), and accordingly, it is possible to receive an input from the user in accordance with the movement of the user's eye(s).

Referring to FIG. 4, a pointer 320 that moves with the movement of the input unit, as described above, may be displayed on the screen 300, such that the pointer 320 can indicate the position that the user intends to point out with the input unit. The pointer 320 can be used to select an item as well.

Figure 5:
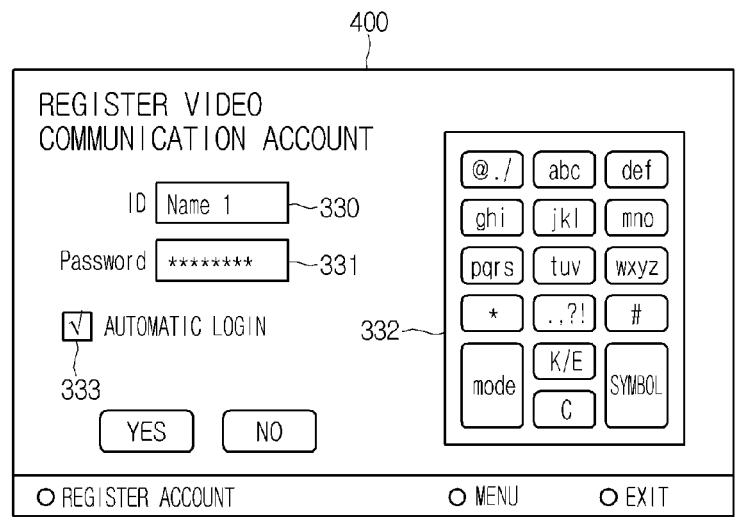
FIG. 5 is a diagram showing an embodiment of a method of a registering a video call account from an external device.

FIG. 5 is a diagram showing an embodiment of a method of registering identification information for a video call into the external device 70.

Referring to FIG. 5, input windows 330, 331 that are connected to the video communication network are displayed on a screen 400 of the external device 70. The input windows 330, 331 allow an input of identification information, for example, accounts, such as a user ID and a password, which makes it possible to recognize video calls received to the display apparatus 10. The user can input the ID and the password to the windows 330, 331 using a keypad 332 or other known means. For instance, the user of the display apparatus 10 can input his or her ID and password into the external device 70 so that the user/display apparatus 10 is pre-registered into the external device 70. In this example, the user's ID is 'Name 1'.

Further, if the user selects an automatic log-in for the input video communication account (e.g., 'Name 1' account information), for example, the user marks the portion 333 for the automatic log-in, then the automatic log-in is performed with the input ID, for example, 'Name 1' when the external device 70 is turned on and as a result, the external device 70 is connected to the network. For example, the user can register the video communication service account into the external device 10 by inputting his or her ID and the password for the video communication service, using the method described with reference to FIG. 5, such that the external device 70 can recognize vide calls received by the display apparatus 10 in association with the registered video communication service/calls while the external device 70 is connected to the video communication network.

Meanwhile, according to another embodiment of the present invention, the registration of a video communication account described with reference to FIG. 5 can be performed in the display apparatus 10. Further, the registered information can be downloaded and stored from the display apparatus 10 to the external device 70 when these devices are turned on. The registration may also occur at a server side and such registration information can be sent and stored from the server to the display apparatus 10 and/or the external device 70. Modifications of the registration information can occur as needed through the same methods used to register the account.

Figure 6:
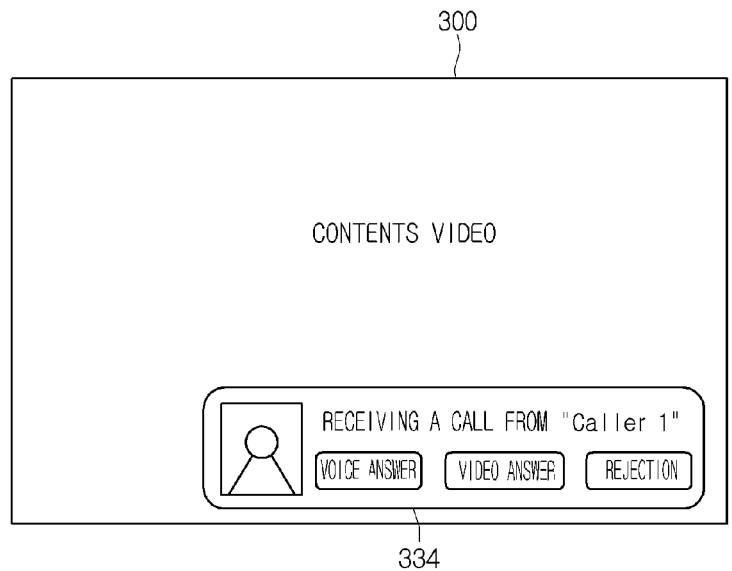
FIGS. 6 and 7 are diagrams showing an embodiment of a method for connecting to a video call received by turning on a display apparatus.

FIG. 6 is a diagram showing an embodiment of a method of connecting the display apparatus 10 to a received video call.

Referring to FIG. 6, a contents video, for example, when a broadcasting video received through the tuner 105 is displayed on the screen 300 of the display apparatus 10, and a call is received to the 'Name 1', e.g. the current log-in account at the display apparatus 10, then a popup window 334 showing a reception of the video call can be displayed on the screen 300. The user can select any one of the buttons in the popup window 334, e.g., 'voice answer' (e.g., answering using voice only), 'video answer' (e.g., answering using both video and voice), and 'rejection'.

The user ('Name 1') does not answer the call received from a 'caller 1', by selecting the 'rejection' button. On the other hand, the user at the display apparatus 1 can perform a voice call in response to the video call received from the 'caller 1' (e.g., from the device 20, 30, 40, 50 or 60) by selecting the 'voice answer'. For example, when a video call is made from the 'caller 1', the user may perform only a voice call with the 'caller 1' while rejecting a video call with the 'caller 1' by selecting the 'voice answer'. Further, the user can perform a video call with the 'caller 1' by selecting the 'video answer'. For example, when the display apparatus 10 is turned on and contents are displayed on the screen 300, the display apparatus 10 can request an answer of the user through the user interface, as shown in FIG. 6, by directly receiving the video call.

On the other hand, when the display apparatus 10 is turned off, the display apparatus 10 is turned on in response to a control signal transmitted from the external device 70 as discussed above (e.g., in the method of FIG. 3), and then can request a selection among the options in the window 334 from the user through the user interface as shown in FIG. 6.

Figure 7:
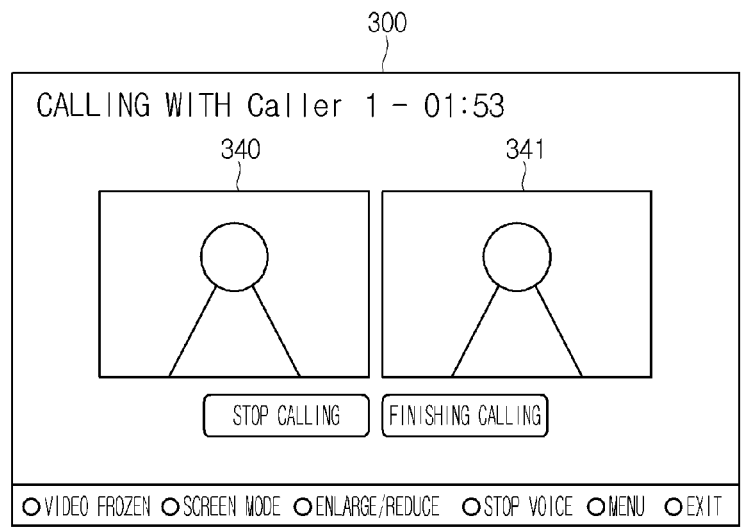

When the user answers the received video call, as shown in FIG. 7, the contents video and the call video, for example, the counterpart's call video 341 can be displayed simultaneously on the screen 300. For example, the AV processor 115 can simultaneously process the video communication data inputted from the video communication processor 120 and the video/voice data of the contents inputted from the tuner 105, such that the user can perform a video call while watching the contents. The image of the user (e.g., 'Name 1' user) 340 and the image of the counterpart (e.g., 'Caller 1') 341 may be displayed on the screen 300. Such images may be moving images (live) or still pictures obtained from the cameras or from the corresponding storage unit. Further, TV programs or other video contents may also be displayed on another portion of the screen 300 so that if desired, the user can perform the video call while viewing programs.

As another embodiment of the present invention, any one of the contents video and the call video may be displayed in a PIP (Picture In Picture) type on the screen 300.

Meanwhile, the display apparatus 10 can process call forwarding that connects the received video call to another external device, for example, a portable terminal of the user. For example, when the display apparatus 10 is turned on, or has been turned off and turned on by a control signal from the external device 70, the received video call may be forwarded to a portable terminal (e.g., user's mobile phone or laptop, etc.) that has been registered in advance, if the user does not answer the received video call at the display apparatus 10 over a predetermined time.

According to an embodiment of the present invention, the display apparatus 10 can set or receive turn-on conditions for when a video call is received, such that the display apparatus 10 can be turned on in response to a control signal inputted from the external device 70 only when these input turn-on conditions are satisfied. An example of this operation is discussed in reference to FIG. 8.

Figure 8:
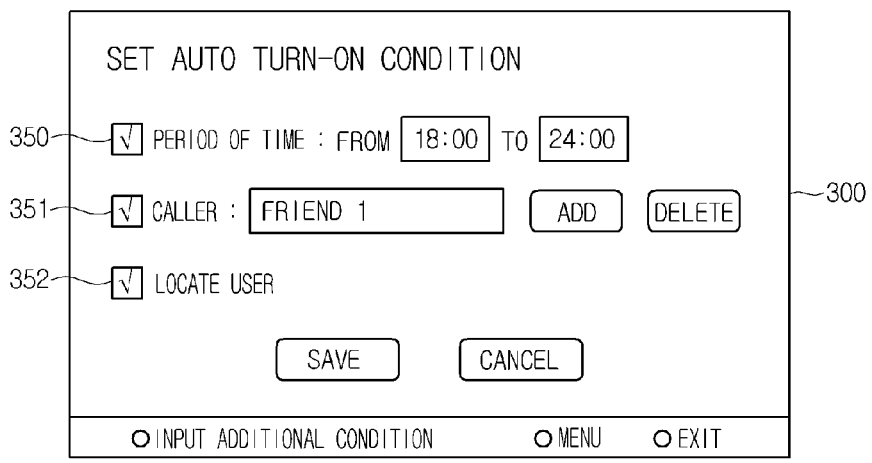
FIG. 8 is a diagram showing an embodiment of a method of setting up turn-on conditions of a display apparatus.

FIG. 8 is a diagram showing an embodiment of a method of setting up turn-on conditions of a display apparatus. Referring to FIG. 8, the turn-on conditions may include one or more of a period of time during which time the display apparatus 10 is turned on, the caller who can turn on the display apparatus 10, and whether there is a user nearby, etc. For example, the user can select a box 350 for setting the period of time for turning on the display apparatus 10 and input a start time and a stop time in a time input window, by using an auto turn-on condition menu displayed on the screen 300 of the display apparatus 10.

When the turn-on conditions as shown in FIG. 8 are set up, when the current time is not within the input period of time, that is, from 18:00 to 24:00, even if a control signal for turning on the display apparatus 10 is transmitted from the external device 70, the display apparatus 10 may not be turned on in response to the control signal. On the other hand, when the current time is within the set period of time of the turn-on conditions (e.g., from 18:00 to 24:00), the display apparatus 10 may be turned on in response to the control signal transmitted from the external device 70.

In addition to or as an alternative to the turn-on times, the user can specify the caller of the video call that would turn on the display apparatus 10, as the turn-on condition. Referring to FIG. 8, the user can input information about one or more callers that the user authorizes to turn on the display apparatus 10, by selecting a box 351 for setting a caller whose calls will turn on the display apparatus 10 (which has been turned off), in response to a video call, in a caller input window. For example, the user may add callers in the turn-on conditions or may delete specific callers from the caller list, with reference to an address list stored in advance in the display apparatus 10.

Therefore, the display apparatus 10 may not be turned on, when the caller of a current video call is not one of the callers registered in the turn-on conditions (e.g., at the box 351), even if a control signal for turning on the display apparatus 10 is transmitted from the external device 70. On the contrary, the display apparatus 10 may be turned on in response to a control signal transmitted from the external device 10, when the caller of the current video call is a caller included in the caller list stored in the turn-on conditions.

In addition to or as an alternative to the other turn-on condition(s), the turn-on conditions may be set up such that the display apparatus 10 is turned on, only when the user exists around or is near the display apparatus 10. For example, when a box 352 for locating the user is selected as the turn-on condition and the user does not exists in the home where the display apparatus 10 and the external device 70 are provided, the display apparatus 10 may not be turned on in response to the control signal transmitted from the external device 70.

On the other hand, the display apparatus 10 may be turned on in response to a control signal transmitted from the external device 70, when the user is near the display apparatus 10 to receive the incoming video according to the turn-on conditions. Therefore, the display apparatus 10 may not be turned on when the user is not nearby the display apparatus 10 and thus cannot answer the incoming video call, thereby preventing unnecessary power consumption. The display apparatus 10 may determine whether or not the user is nearby using known techniques such as using a motion sensor or infrared sensor. For instance, if the user is position in front of the display apparatus, the infrared sensor of the turned-off display apparatus 10 may sense the user's presence and inform the controller 110 that the user is nearby.

The user can store the set results in the memory 130 of the display apparatus 10 by inputting turn-on conditions, such as a turn-on period of time, callers, and location of users (locate user), and pressing the save button. Meanwhile, a variety of conditions, other than the turn-on conditions shown in FIG. 8, may be additionally inputted by the user.

The method of inputting turn-on conditions for the display apparatus 10, as described with reference to FIG. 8, may be performed in the external device 70, and the set turn-on conditions may be stored in the external device 70, in addition to the memory 130 of the display apparatus 10. In such case, the inputted turn-on condition information may be transmitted from the external device 70 to the display apparatus 10 for storage therein. Further, when the turn-on conditions are stored in the external device 70, the external device 70 determines first whether the set turn-on conditions are satisfied in receiving a video call, and then can transmit a control signal for turning on the display apparatus 10 only when the turn-on conditions are satisfied.

According to an embodiment of the present invention, the user input unit 145 of the display apparatus 10 can receive identification information to be forwarded from the user, for example, the mobile phone number of a portable terminal, and the controller 110 can store the input identification information on the external device into the memory 130. Thereafter, when a video or a voice call is received by the communication unit 100, the video call processor 120 determines whether to forward the received call, and can forward the received call to another external apparatus corresponding to the identification information stored in the memory 130, for example, the portable terminal having the stored phone number. This forwarding method will be discussed in more detail in reference to an example shown in FIG. 9.

Figure 9:
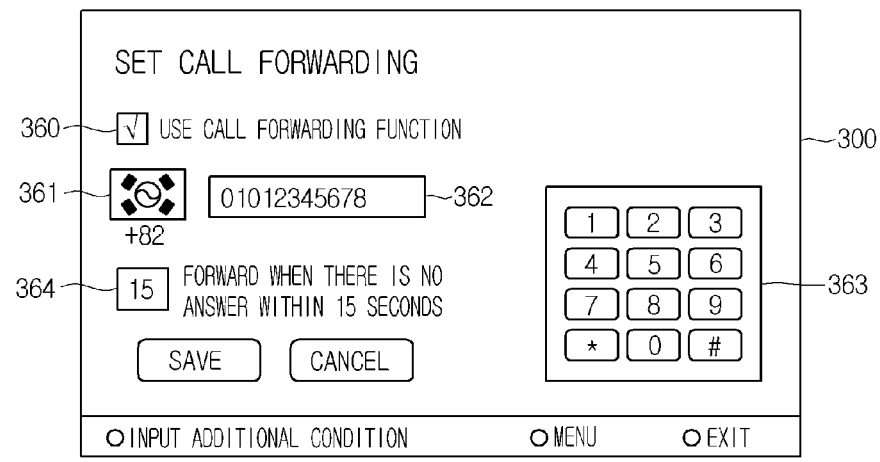
FIG. 9 is a diagram showing an embodiment of a method of setting up forwarding for a received call.

FIG. 9 shows an embodiment of a method of forwarding a received video call, in which a screen provided to a user for setting call-forwarding is shown.

Referring to FIG. 9, a graphic user interface GUI for setting call-forwarding may be provided on the screen 300 of the display apparatus 10. For example, a box 360 for selecting whether to use the call-forwarding function described above is displayed on the screen 300, and as shown in FIG. 9, the user can select the call-forwarding function by checking the box 360.

Further, at least one of input windows 362, 364 for inputting identification information about the external apparatus where the received call is forwarded to, for example, for inputting the phone number of the external apparatus may be displayed on the screen 300. In more detail, the user can input or select the national code of the corresponding phone number (e.g., phone number of the external apparatus to which the call is to be forwarded) by using a nation input window 361, and then input the phone number to where the call is forwarded in a number input window 362.

The phone number described above can be inputted by a keypad 363 displayed on the screen 300, and for example, the phone number of the device to which the calls may be forwarded can be inputted by selecting numbers on the keypad 363, using a user input unit, such as a spatial remote controller. Further, the user can input the phone number, using number buttons of a remote controller to control the operation of the display apparatus 10.

Phone numbers that can be inputted by the input windows 362, 364 may be common phone numbers using a PSNT communication network or internet phone numbers using the VoIP communication network, as well as the number of mobile phones using a mobile communication network.

Meanwhile, conditions for forwarding a received call, for example, a condition input window 364 for inputting a forwarding time may be displayed on the screen 300. In more detail, a user can input a predetermined forwarding time in the condition input window 364, using the number buttons of the keypad 363 of the screen 300 or the remote controller. For example, as shown in FIG. 9, when 15 seconds is inputted in the condition input window 364, then according to this input, the forwarding condition is considered to be satisfied when the user does not answer the received call within 15 seconds from when the call is received. In that case, the received call can be forwarded to the portable terminal or external apparatus having the phone number inputted in the number input window 362. As a variation to using the phone number of the external apparatus to which the video calls may be forwarded, other identification information may be inputted and used. For instance, the user may be able to select an apparatus from a list of possible apparatuses (provided by the display apparatus 10) which can receive the forwarded video calls. In other examples, the name of the actual external apparatus may be selected. If the display apparatus 10 prestores connection information for the external apparatus, then the display apparatus 10 can merely use such connection information to connect to the identified external apparatus and forward the incoming video calls to the identified external apparatus through the connection.

The user can store forwarding setting information in the memory 130 by inputting whether to use the forwarding function, the phone number of an external apparatus to which the calls may be forwarded, and forwarding conditions and then pressing a save button.

Meanwhile, various forwarding conditions, in addition to the forwarding time described above, can be set up by the user. For example, when the display apparatus 10 is turned off and the user is not at home provided with the display apparatus 10 and the external device 70, the external device 70 can turn on the display apparatus 10 by transmitting a control signal when receiving a video call. In this case, since the user would not answer the received video call at the display apparatus 10, the received video call is forwarded to the portable terminal (e.g., smart phone) of the user by using the video call forwarding, as described with reference to FIG. 9, such that the user can answer the video call.

Figure 10:
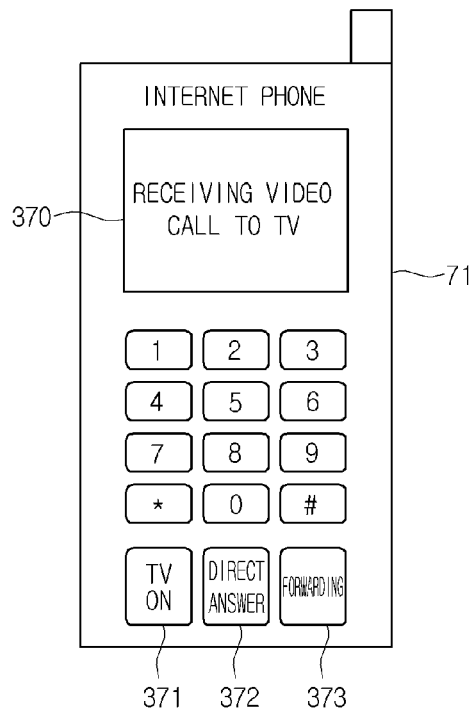
FIGS. 10 and 11 are diagrams showing embodiments of a method of processing a video call received by an internet telephone.
Figure 11:
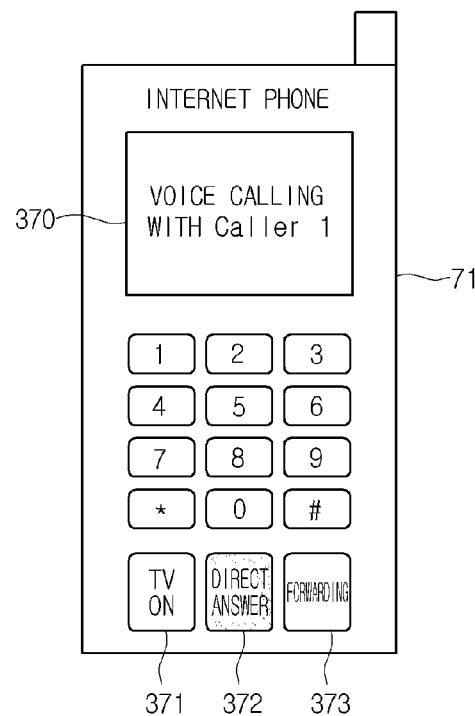

FIGS. 10 and 11 are diagrams showing embodiments of a method of processing a video call received by an internet phone, in which an internet phone 71 may be an example of the external device 70 having the configuration and operating, as described above.

Referring to FIG. 10, the internet phone 71 may have a "TV ON" button 371 for turning on the display apparatus 10 to answer a received video call, a "direct answering" button 372 for directly answering the received video call by using the internet phone 71, and a "forwarding" button 373 for forwarding the received video call to another device. For example, a message showing that a video call is received to the display apparatus 10 is displayed on the screen 370 of the internet phone 71 while a video call reception alarm can be made.

The user can turn on the display apparatus 10 by selecting the "TV ON" button 371, in which the internet phone 71 generates and transmits a control signal for turning on the display apparatus 10, as described above, to the display apparatus 10.

Alternatively, the user may directly answer the received video call by selecting the "direct answering" button 372. In this case, the internet phone 71 does not transmit a control signal for turning on the display apparatus 10 and the display apparatus 10 is kept turned off, while the user can perform the video call received to the display apparatus 10 with the internet phone 71. However, when the internet phone 71 does not support a video call, as shown in FIG. 11, the user can make a voice call for the received video call by using the internet phone 71.

Meanwhile, the user can forward the received video call to another device, for example a portable device determined by the user and answer the call by selecting the "forwarding" button 373 of the internet phone 71.

As described above, as the method of processing a video call received to the display apparatus 10, various methods, other than the method using the buttons 371, 372, 373 of the internet phone 71, for example, a method of recognizing the user's voice or inputting by using a touch screen may be used, which can be applied to various external devices/apparatuses, such as a refrigerator or a fax machine, other than the internet phone 71.

According to an embodiment of the present invention, when the user does not input anything to the display apparatus 10 for a predetermined time after the display apparatus 10 is turned on by the control signal received from the external device 70, the display apparatus 10 may be turned off again. Therefore, it is possible to prevent the display apparatus 10 from being automatically turned on and maintained in the turned-on state in response to reception of a video call, unnecessarily for a long time and/or without a user interaction/presence. This also controls power consumption by the display apparatus 10 efficiently.

Figure 12:
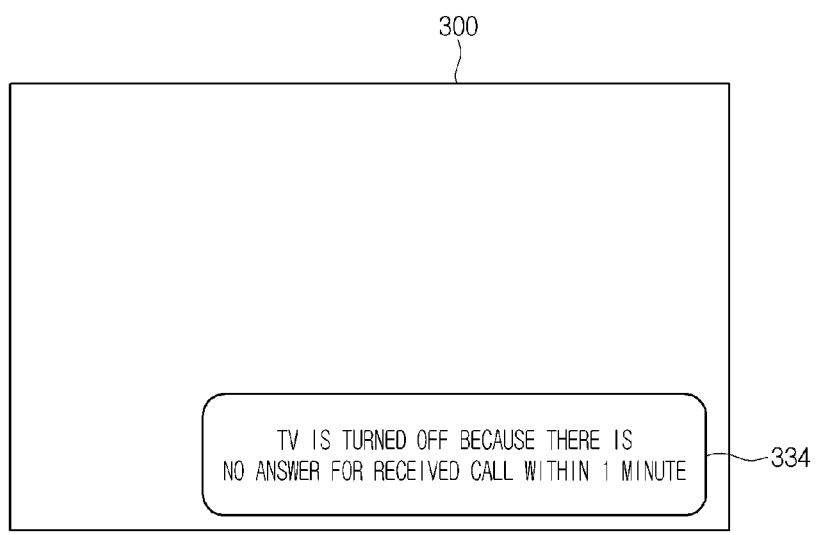
FIG. 12 is a diagram showing an embodiment of a method of turning off a display apparatus.

Referring to FIG. 12, when the user sets up the automatic turn-off time of the display apparatus 10 to 'one minute' and the user does not answer a connected video call for a predetermined time at the display apparatus 10, the display apparatus 10 (e.g., DTV) may be automatically turned off again. For example, as shown in FIG. 6, when the user does not answer (e.g., user does not select any one of the "voice answer", "video answer", and "rejection") for one minute after the display apparatus 10 is automatically turned on and connected to the incoming video call by the control signal transmitted from the external device 70, the display apparatus 10 may be automatically turned off again. And the user may informed us such a situation via the pop-up window 334 on the screen 300 as shown in FIG. 12. Preferably this pop-up window 334 will be displayed just before the display apparatus 10 is automatically turned off. Therefore, it is possible to prevent the display apparatus 10 from being automatically turned on and maintained in the turned-on state unnecessarily while the user does not or cannot answer the received video call within a predetermined time period.

Figure 13:
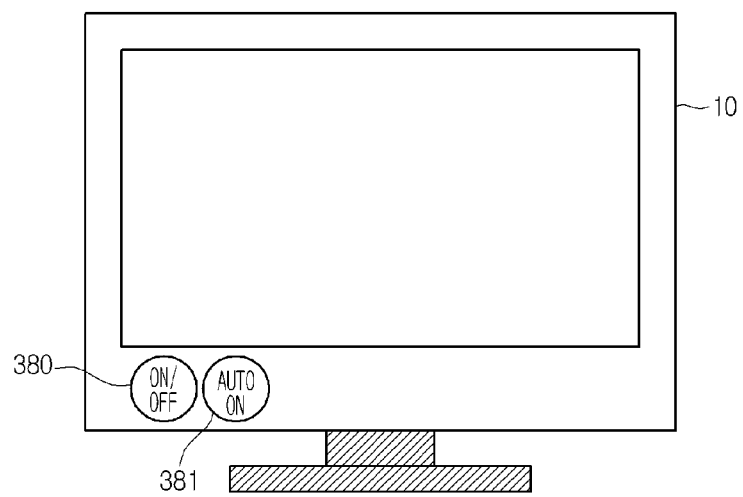
FIG. 13 is a diagram showing an embodiment of a method of setting up a power mode of a display apparatus.

FIG. 13 is a diagram showing an embodiment of a method of setting up a power mode of a display apparatus. The power mode of the display apparatus 10 may further include an "automatic turn-on" state, other than common "turn-on" and "turn-off" state.

Referring to FIG. 13, it is possible to turn on or turn off the display apparatus 10 by selecting an "ON/OFF" button 380 of the display apparatus 10. The "ON/OFF" button 380 is a conventionally known turn-on/off button. Further, according to the invention, the user can select an additional "AUTO ON" button 381 of the display apparatus 10, in which the power mode of the display apparatus 10 is converted into an "automatic turn-on" state, such that the methods of connecting the display apparatus 10 to a video call can be performed, as described with reference to FIGS. 3 to 12. For example, when the user sets up the power mode of the display apparatus 10 in a conventional "turn-off" state (e.g., the operation of the button 380), the display apparatus 10 may not be turned on in response to a control signal transmitted from the external device 70.

For this operation, when the display apparatus 10 is in the "turn-off" state, it is possible to prevent the external device 70 from transmitting a control signal for turning on the display apparatus 10 when receiving a video call, or prevent the control signal from being received by preventing the wireless communication module 150 of the display apparatus 10 shown in FIG. 2 from operating, or prevent the display apparatus 10 from being turned on, even if the control signal is received.

On the other hand, when the user sets up the power mode of the display apparatus 10 in the "automatic turn-on" state (e.g., the operation of the button 381), the display apparatus 10 may be turned on automatically in response to a control signal from the external device 70 when receiving a video call as discussed above.

Figure 14:
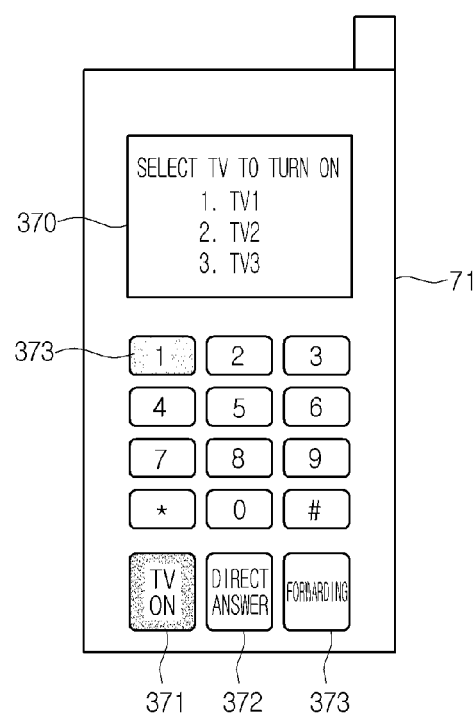
FIG. 14 is a diagram showing an embodiment of a method of selecting a display apparatus to connect to a received video call.

FIG. 14 is a diagram showing an embodiment of a method of selecting a display apparatus to connect to a received video call, in which the internet phone 71 may be an example of the external device 70 having the configuration and operations, as described above.

Referring to FIG. 14, when a user selects the "TV ON" button 371 for turning on the display apparatus 10, a list of display apparatuses 10 which have been registered in advance, for example, "TV1", "TV2", and "TV3" may be displayed on the screen 370 of the internet phone 71.

The user can select a display apparatus 10 (e.g., TV3) for answering the received video call from the list displayed on the screen 370, and the internet phone 71 can turn on and connect the selected display apparatus 10 to the video call by generating a control signal for turning on the display apparatus 10 and transmitting the control signal to the display apparatus 10 that the user has selected from the list, for example, the "TV3".

As shown in FIG. 14, the user can select the display apparatus to turn on, by pressing a button corresponding to the desired display apparatus 10, in the number buttons of the internet phone 71. For example, when the user presses the "1" button 373 of the internet phone 71, the "TV1" is selected from the list on the screen 370, such that the selected "TV1" can be turned on by a control signal transmitted from the internet phone 71. Here, a video call may be received by another device and the user at the external device 70 can select a new device (e.g., TV1) to receive the video call, or a video call may be sent to multiple devices (e.g., TV1, TV2 and TV3) and then the user can select one of these multiples devices to be turned on to take on the video call. As still another variation, a video call may be received to the external device 70 and the user may select another device (e.g., TV1, TV2 and/or TV3) to take on the received video call instead of the external device 70. Other variations are possible.

Figure 15:
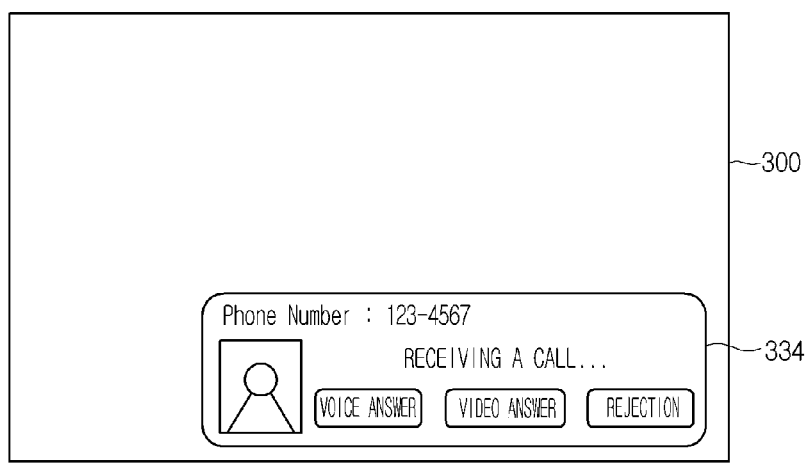
FIG. 15 is a diagram showing an embodiment of a method of connecting to a received video call, by using the number given to a display apparatus.

According to another embodiment of the present invention, the display apparatus 10, as described above, may not perform log-in with the account for the connection of a video call and may be connected to the received video signal by using the number assigned to the display apparatus 10. FIG. 15 is a diagram showing an embodiment of a method of connecting to a received video call, by using the number given to a display apparatus.

Referring to FIG. 15, not a service account, but a phone number, for example, "123-4567", may have been assigned as the identification information for a video call of the display apparatus 10. Meanwhile, the phone number of the display apparatus 10, "123-4567" may have been registered in the external device 70 by a method similar to the method described with reference to FIG. 5. The external device 70 can turn on the display apparatus 10 by transmitting a control signal, when a video call is received on the registered phone number of the display apparatus 10, "123-4567". Therefore, a plurality of users can receive a video call with the display apparatus 10 while the display apparatus 10 and the external device 70 may not be connected with only a video call for a specific log-in user.

Figure 16:
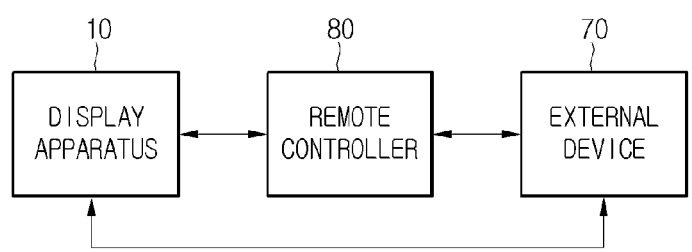
FIG. 16 is a block diagram illustrating the configuration of a video call system according to another embodiment of the present invention.

FIG. 16 is a block diagram illustrating the configuration of a video communication system according to another embodiment of the present invention, in which the same description in the operation of the system as that provided with reference to FIGS. 1 to 15 may not be repeated below.

Referring to FIG. 16, a remote controller 80 has a plurality of buttons for user input, and can control the operation of the display apparatus 10 by generating and transmitting a control signal corresponding to button inputs from the user, to the display apparatus 10. For example, the remote controller 80 can generate and transmit a signal for turning on the display apparatus 10 to the display apparatus 10, using local wireless communication, such as infrared communication WiFi (Wireless Lan), Bluetooth, and ZigBee, when the user presses the "turn-on" button.

According to an embodiment of the present invention, the external device 70 generates and transmits the control signal to the remote controller 80 when a video call is received, the remote controller 80 transmits a signal for turning on the display apparatus 10 in response to the control signal transmitted from the external device 70, thereby automatically turning on the display apparatus 10. The methods of the invention may also be implemented in the system of FIG. 16.

According to another embodiment of the present invention, the display apparatus 10 that has been turned off can be turned on by itself to respond to the received video call.

Figure 17:
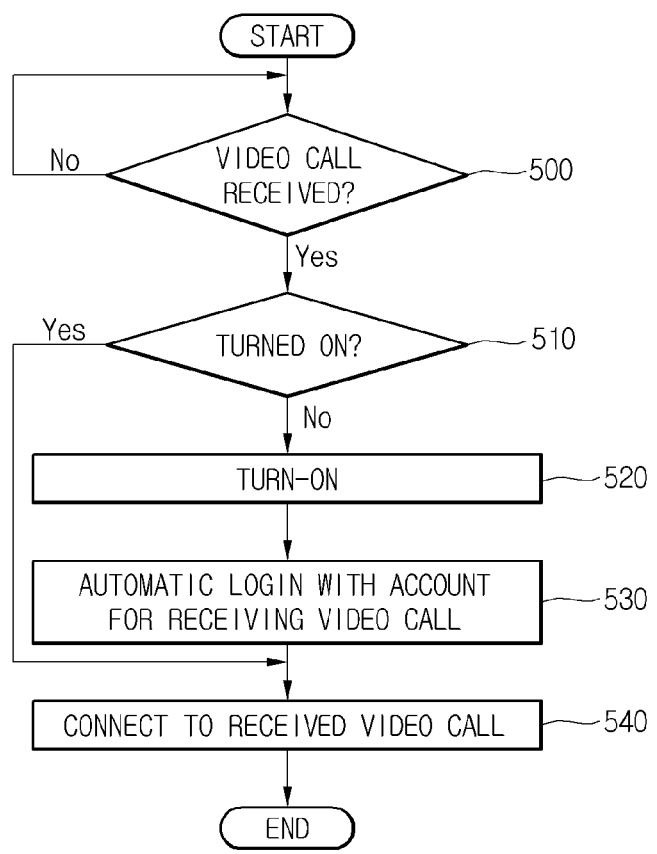
FIG. 17 is a flowchart illustrating a method for connecting to a video call of a display apparatus according to another embodiment of the present invention.

FIG. 17 is a flowchart illustrating a method for connecting to a video call of a display apparatus according to another embodiment of the present invention and the method illustrated in FIG. 17 is described in connection with the block diagram illustrating the configuration of a display apparatus according to the embodiment of the present invention shown in FIG. 2.

Referring to FIG. 17, the display apparatus 10 ascertains whether a video call is received (step 500) and ascertains whether it is in the turn-on state now, when the video call is received (step 510). For example, the display apparatus 10 is connected to a video communication network by the internet, etc., even if it is turned off, such that it can ascertain whether the video call is received. For this operation, the communication unit 100 of the display apparatus 10 can be ready to receive a video call while being connected with the display apparatus of the counterpart or a server for the video communication service, even if the display apparatus 10 is turned off.

When the display apparatus 10 is turned on, the display apparatus 10 is connected to the received video call so that the video call is carried out between the involved parties (step 540). Meanwhile, when the display apparatus 10 is not logged in now with the account for a video communication service, it can be logged in with the account for receiving the video call, whereas when it has logged in with another account, not the account for receiving the video call, the log-in account can be converted into the account that can receive the video calls (step 530).

At step 520, the display apparatus 10 is turned on, when the display apparatus 10 has been turned off. For example, as the communication unit 100 of the display apparatus 10 that has been turned off receives the incoming video call, the controller 110 may turn on the display apparatus 10 by itself without a control signal from the external device. That is, the operation of turning on the display apparatus 10 by the external device may be performed by one or more components of the display apparatus that is turned off. In such a case, such components of the display apparatus would be powered-on even though other components of the display apparatus 10 are powered-off.

The display apparatus 10 that has been turned on automatically logs in with the receiving account for a video call and is connected to the received video call by using the logged-in account so that the video call can be carried out (step 540).

According to an embodiment of the present invention, when the display apparatus for a video call is turned off, it is possible to efficiently connect the display apparatus to the received video call and reduce power consumed by the display apparatus, by transmitting a control signal for turning on the display apparatus in wireless communication, such as ZigBee, by using an external device in order to take the video call and making the connection with the received video call.

The methods of connecting the display apparatus according to the embodiments of the present invention to a video call may be programmed to be executed by one or more computers and stored in one or more computer-readable recording media, in which the computer-readable recording media may be ROM, RAM, CD-ROM, magnetic tape, floppy disc, portable/removable storage, USB, SIM card, and optical data storage, and may be implemented in a carrier wave type (e.g. transmitted by the internet).

Further, the computer-readable recording media are distributed on computer systems connected through the network(s), and thus the computer-readable recording media may be stored and executed as the computer-readable code by a distribution scheme. Further, functional programs, codes, and code segments for implementing the methods can be inferred by programmers in the related art.

Although preferred embodiments of the present invention have been illustrated and described, the present invention is not limited to the above-mentioned embodiments and various modifications can be made by those skilled in the art without the scope of the appended claims of the present invention. In addition, these modified embodiments should not be appreciated separately from technical spirits or prospects.

What is claimed is:

1. A method for controlling a digital TV (DTV) that can perform video communication through a video call, the method comprising:
when a video call is received by the DTV while the DTV is turned off, receiving, by the turned-off DTV, a control signal from an external device based on an identification information registered for the video call, wherein the external device is configured to perform the video communication by using the identification information and recognize the video call received by the DTV, and wherein while the DTV is turned off, power is supplied to the DTV for receiving the control signal transmitted from the external device;
selectively turning on the DTV in response to the received control signal; and
connecting, by the turned-on DTV, to the received video call.

2. The method according to claim 1, further comprising:
determining, by the turned-on DTV, whether a user answers the received video call within a predetermined time period; and
forwarding, by the turned-on DTV, the video call to another external device if the determining step indicates that the user does not answer the received video call within the predetermined time period.

3. The method according to claim 1, further comprising:
registering, in the DTV, the identification information for the video call.

4. The method according to claim 3, further comprising:
transmitting, from the DTV to the external device, the registered identification information for the video call for storage in the external device.

5. The method according to claim 1, wherein the external device includes at least one of a refrigerator, a telephone, and a fax machine which transmits/receives a signal to/from the DTV, using a local wireless communication.

6. The method according to claim 1, wherein in the receiving step, the DTV receives the control signal from the external device by using a Zigbee wireless communication.

7. The method according to claim 1, further comprising:
receiving at least one turn-on condition for the DTV from a user,
wherein the selectively turning step turns on the DTV in response to the received control signal when the at least one turn-on condition is satisfied.

8. The method according to claim 7, wherein the at least one turn-on condition includes at least one of the following:
a period of time during which the DTV is to be turned on,
an identification of at least one caller whose calls can turn on the DTV, and
a presence of a user near the DTV.

9. The method according to claim 1, further comprising:
in addition to a power turn/off mode of the DTV, providing an automatic turn on mode for automatically turning on the DTV in response to the control signal.

10. The method according to claim 1, further comprising:
automatically turning off the turned-on DTV when the received video call is not answered within a predetermined time period.

11. A digital TV (DTV) that can perform video communication through a video call, the DTV comprising:
a communication module configured to, when a video call is received by the DTV while the DTV is turned off, a control signal from an external device based on an identification information registered for the video call, wherein the external device is configured to perform the video communication by using the identification information and recognize the video call received by the DTV, and wherein while the DTV is turned off, power is supplied to the DTV for receiving the control signal transmitted from the external device;
a controller configured to turn on the DTV in response to the received control signal; and
a video communication processor configured to connect to the received video call after the DTV is turned-on in response to the control signal.

12. The DTV according to claim 11, wherein, after the DTV is turned on in response to the control signal, the controller further configured to:
determine whether a user answers the received video call within a predetermined time period, and
forward the video call to another external device if the determining step indicates that the user does not answer the received video call within the predetermined time period.

13. The DTV according to claim 11, the controller further configured to:
register, in the DTV, the identification information for the video call.

14. The DTV according to claim 13, the communication module further configured to:
transmit, from the DTV to the external device, the registered identification information for the video call for storage in the external device.

15. The DTV according to claim 11, wherein the DTV is connected to the external device including at least one of a refrigerator, a telephone, and a fax machine which transmits/receives a signal to/from the DTV, using a local wireless communication.

16. The DTV according to claim 11, wherein the DTV receives the control signal from the external device by using a Zigbee wireless communication.

17. The DTV according to claim 11, further comprising:
an input unit configured to receive at least one turn-on condition for the DTV,
wherein the DTV is turned on in response to the received control signal when the at least one turn-on condition is satisfied.

18. The DTV according to claim 17, wherein the at least one turn-on condition includes at least one of the following:
a period of time during which the DTV is to be turned on,
an identification of at least one caller whose calls can turn on the DTV, and
a presence of a user near the DTV.

19. The DTV according to claim 11, the controller further configured to:
in addition to a power turn/off mode of the DTV, provide an automatic turn on mode for automatically turning on the DTV in response to the control signal.

20. The DTV according to claim 11, the controller further configured to:
automatically turn off the turned-on DTV when the received video call is not answered within a predetermined time period.

* * * * *